W. L. PATTERSON & G. A. H. KELLNER.
MICROSCOPE.
APPLICATION FILED APR. 9, 1917.
1,283,884.
Patented Nov. 5, 1918.
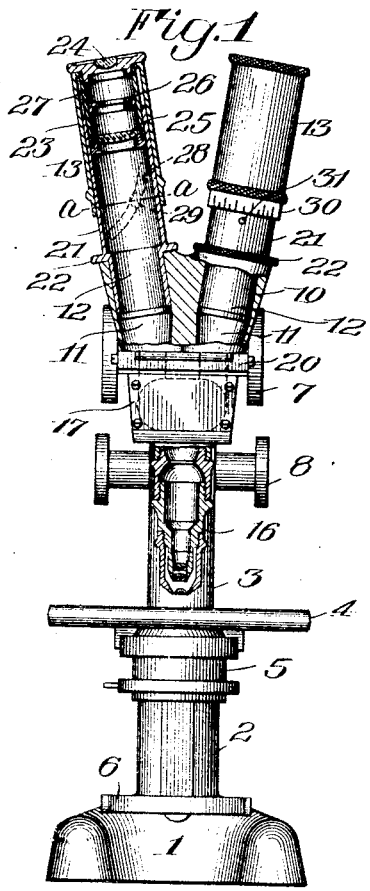
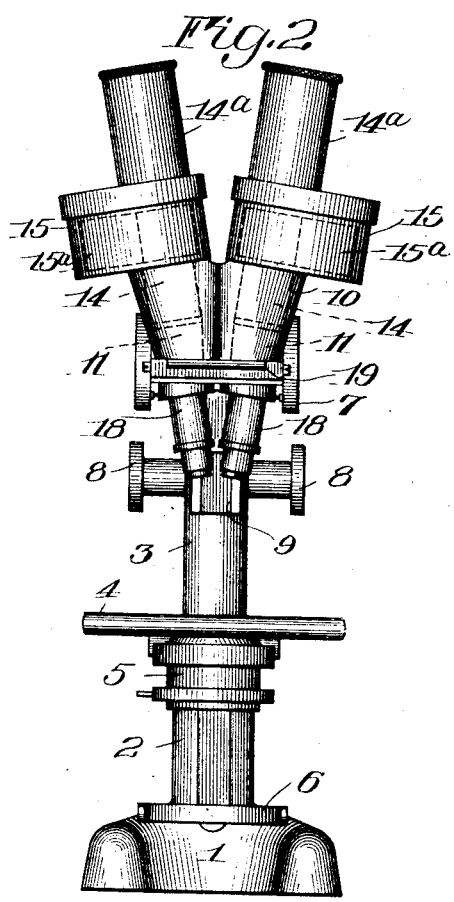
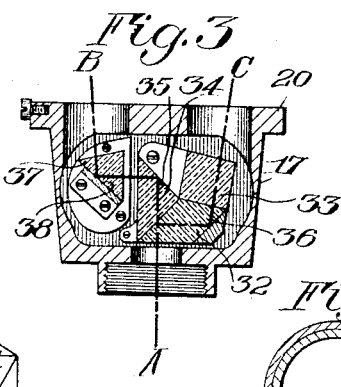
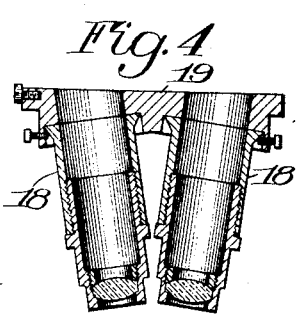
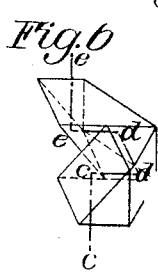
INVENTORS
William L. Patterson
Gustav A. H. Kellner
BY
Their ATTORNEYS

UNITED STATES PATENT OFFICE.

WILLIAM L. PATTERSON AND GUSTAV A. H. KELLNER, OF ROCHESTER, NEW YORK, ASSIGNORS TO BAUSCH & LOMB OPTICAL CO., OF ROCHESTER, NEW YORK, A CORPORATION OF NEW YORK.

MICROSCOPE.

1,283,884.  Specification of Letters Patent.  Patented Nov. 5, 1918.

Original application filed December 27, 1915, Serial No. 68,614. Divided and this application filed April 9, 1917. Serial No. 160,721.

*To all whom it may concern:*

Be it known that we, WILLIAM L. PATTERSON and GUSTAV A. H. KELLNER, both of Rochester, in the county of Monroe and State of New York, have invented certain new and useful Improvements in Microscopes; and we do hereby declare the following to be a full, clear, and exact description of the same, reference being had to the accompanying drawings, forming a part of this specification, and to the reference characters marked thereon.

Our invention relates to microscopes and this application is a division of an application filed by us on the 27th of December, 1915, Serial No. 68,614, for binocular microscopes Patent No. 1,225,167, May 8, 1917.

The present invention has for its object to effect an arrangement of parts combining the advantages of both binocular and monocular types of microscopes in which the binocular instrument, having convergently arranged oculars shall have an interpupilary adjustment which may be effected by the rotation of said oculars. To these and other ends the invention consists in certain improvements and combinations of parts, all as will be hereinafter more fully described, the novel features being pointed out in the claims at the end of the specification.

In the drawings:

Figure 1 is a front elevation of a binocular microscope of the mono-objective type, constructed according to our invention, parts of the instrument being shown in section.

Fig. 2 is a front elevation showing the various parts embodying the invention in assembled position;

Fig. 3 is an enlarged vertical sectional elevation of the single objective prism box shown in Fig. 1;

Fig. 4 is a vertical section on an enlarged scale of the twin objective mounting shown in Fig. 2;

Fig. 5 is an enlarged sectional view taken on line *a—a* of Fig. 1, showing the means of adjusting the oculars, and Fig. 6 is a perspective view of an ocular prism system for erecting an image and permitting the oculars to be adjusted laterally relatively to each other.

Similar reference characters throughout the several views indicate the same parts.

The present invention comprehends a microscope having an objective prism system functioning between a single objective and a pair of convergently arranged oculars, rotatable to effect adjustment of the interpupilary distance thereof, said prism system serving to direct a portion of the light received from the objective into each of the oculars.

In another arrangement of the parts contemplated by the invention, as shown in Fig. 2, the single objective together with its prism box shown in Fig. 1 may be removed and the twin objectives substituted therefor. In this form of instrument prisms for erecting the image are carried in the separate casings and the oculars are mounted thereon, while in the first mentioned disposition of the parts the objective prism system is carried in a single casing and associated with the objective.

In the drawings, 1 indicates the microscope base, upon which is mounted the pillar 2 carrying the arm 3 which may be pivotally connected with or rigidly secured to the pillar. Extending from the lower end of the arm is a microscope stage 4 and carried beneath the latter is a condenser mounting 5 and mirror 6. The "coarse" rack and pinion adjustment for the lens tube is indicated by 7 and the "fine" adjustment mechanism by 8. The body tube-member and associated parts are mounted upon a slideway 9.

The body tube-member indicated by 10, is provided with converging bores 11 forming light passages therethrough. In Fig. 1 the extensions 12 of the non-erecting oculars 13 are projected into the bores, while in Fig. 2 the extensions 14 of the erecting prism casings 15 are rotatably mounted within said bores, the prisms therein being indicated by dotted lines at 15$^a$. The non-erecting oculars 13 are suited for use either in connection with the single objective 16, depending from the objective prism box 17, or with the twin objectives 18 on the mounting 19 shown in Figs. 2 and 4. The mounting 19 is similarly constructed to the portion 20 of the prism box 17 so that these parts are interchangeable, whereby the prism box 17, carrying the single objective 16, may be removed and replaced by the twin objectives 18 on the mounting 19, or vice versa.

The single objective 16 is also removably connected with the prism box 17 so that other objectives may, if desired, be substituted for the one shown.

The converging non-erecting oculars 13 comprise the upper extension tubes 21 provided with the flanges 22 seated upon the body tube-member 10. Coöperating with the extension 21 is a tubular member 23 which carries an eyepiece comprising eye lens 24, field lens 25, diaphragm 26 and a suitable mount 27 therefor. The member 21 is provided with a suitable groove 28 receiving the end of a screw 29 threaded into member 23, as shown in Fig. 5. A scale 30 is provided on member 23 and coöperates with an index 31 to facilitate the rotary adjustment of the tubular member to insure the proper interpupilary distance of the eye lenses 24 being attained. The angle of convergence of the axes of bores 11 is such that the lines of sight from eye lenses 24 converge at an angle preferably of 16° which had been found to be a very desirable angle of convergence.

In Fig. 2 the interpupilary distance of the ocular 14ª is adjusted by rotation of the erecting prism casings 15, upon which the oculars are eccentrically mounted, the oculars being also eccentrically arranged with respect to the tubular projections 14 at the bottom of the casings which are journaled in the bores of the tube-member.

The objective prism system functioning between the oculars 13 and objective 16 is clearly shown in Fig. 3. Within the box 17 are mounted the prisms 32 and 33 which are cemented together at their contacting surfaces and thereby made practically integral. The prism 34 where it contacts with prism 32 is provided with a half shade silver film which divides the light rays received from the direction of objective axis A and directs one-half of the rays along ocular axis B and the other half along ocular axis C. The reflecting surface 35, of prism 34 and surface 36 of prism 32, are preferably silvered. The prism system just described may be designated as a "primary objective prism system" and coöperating therewith is a supplementary prism 37, the surface 38 of which is preferably silvered. These prisms are supported by any suitable means mounted upon the walls of the casing 17.

In the erecting prism systems contained in the casings 15 the rays enter from the objectives 18, or from the objective axes B and C, when the single objective with its prism system is employed. With this type of ocular the image is viewed erect, this being accomplished by means of a prism system such as shown in Fig. 6 in which the rays entering from an ocular 18 along the line c—c are then deflected rearwardly along the line c—d, thence laterally along line d—d, thence forwardly as indicated by d—e and finally in an upward direction along the line e—e and entering the eyepiece or ocular 14ª. This type of ocular prism provides an erecting system whereby the image viewed stands erect and which for many purposes where a slight loss of light due to the added number of reflections and the amount of glass to be traversed is not a detrimental feature. By means of the combination of parts described it will be seen that we thus have an instrument wherein a twin objective is interchangeable with a single objective and wherein eyepieces, such as 14ª, Fig. 2, having prismatic erecting systems are interchangeable with simple eyepieces, such as the oculars 13 shown in Fig. 1.

We claim as our invention:

1. In a binocular microscope, a body tube-member having a pair of divergent light passages therethrough, a pair of oculars mounted in alinement with said light passages, a pair of sleeves in which the oculars are mounted, and means for varying the interpupilary distance of the oculars by rotation of the sleeves.

2. In a binocular microscope, a body tube-member having a pair of divergent light passages formed therethrough, a pair of ocular carrying sleeves mounted in alinement with said light passages, means for effecting longitudinal adjustment of the sleeves upon rotation thereof to provide for adjustment of the interpupilary distance of the oculars, and an objective system comprising an objective arranged with its axis bisecting the angle of divergence of said light passages.

3. In a binocular microscope, a body tube-member having a pair of divergent light passages formed therethrough, a pair of ocular carrying sleeves rotatable to effect adjustment of the interpupilary distance of the oculars, an objective system beneath said body tube member and objective prisms functioning between the objective system and the oculars to direct the light received from said system through said passages into the oculars.

4. In a microscope, a twin body tube-member having a pair of converging light passages formed therethrough, a pair of ocular carrying sleeves mounted in alinement with said light passages and arranged to be adjusted relatively to the body member with a helical motion to adjust the interpupilary distance of the oculars, a scale and index coöperating to indicate the interpupilary distance of the oculars, an objective system comprising an objective arranged with its axis bisecting the angle of divergence of said light passages and an objective prism functioning between the objective and the oculars to direct a portion of the light received from the objective through said passages into each ocular.

5. An attachment for microscopes having a binocular body tube-member, said attachment consisting in the combination of a pair of light passages adapted to be divergently carried by the ocular end of said body tube member, a pair of ocular carrying sleeves mounted in alinement with said light passages and adapted to be adjustable with relation thereto with a helical motion to adjust the interpupilary distance of the oculars, a scale and index coöperating to indicate the interpupilary distance of the oculars, an objective system comprising an objective arranged with its axis bisecting the angle of divergence of said light passages and an objective prism functioning between the objective and the oculars to direct a portion of the light received from the objective into each ocular, and a support for the objective system adapted to be carried by the objective end of the body tube.

WILLIAM L. PATTERSON.
GUSTAV A. H. KELLNER.

Copies of this patent may be obtained for five cents each, by addressing the "Commissioner of Patents, Washington, D. C."